United States Patent

[11] 3,559,809

| [72] | Inventor | Stephen Barrett Barmore<br>Southington, Conn. |
|---|---|---|
| [21] | Appl. No. | 797,428 |
| [22] | Filed | Feb. 7, 1969 |
| [45] | Patented | Feb. 2, 1971 |
| [73] | Assignee | AMF Incorporated<br>a corporation of New Jersey |

[54] FILTER BACKWASH MEANS
12 Claims, 7 Drawing Figs.

[52] U.S. Cl. .................................................. 210/333,
210/340, 210/411, 210/416
[51] Int. Cl. ...................................................... B01d 35/22
[50] Field of Search............................................ 210/406,
333, 411, 82, 340, 341, 167, 258, 278, 416, 425,
427, 146, 138, 142

[56] References Cited
UNITED STATES PATENTS

| 2,940,595 | 6/1960 | Crane ........................... | 210/333 |
| 2,970,696 | 2/1961 | Mummert...................... | 210/411X |
| 3,421,835 | 1/1969 | McCarty ....................... | 210/333X |

FOREIGN PATENTS

| 1,279,340 | 11/1961 | France .......................... | 210/333 |

Primary Examiner—Frank A. Spear, Jr.
Attorneys—George W. Price and Murray Schaffer ABSTRACT: A Filtering System which is capable of handling large quantities of coolants and the System includes a reservoir for filtrates as, for example, from metal-working machines. The filtrate is returned to such machines by a pump which draws some of it from the reservoir, passes it through an eductor and then returns it to the reservoir. In operation, suction is applied to the outlet side of the filters to cause flow through them. In addition, valve means are provided so that the pump discharge can be used to clean the filters.

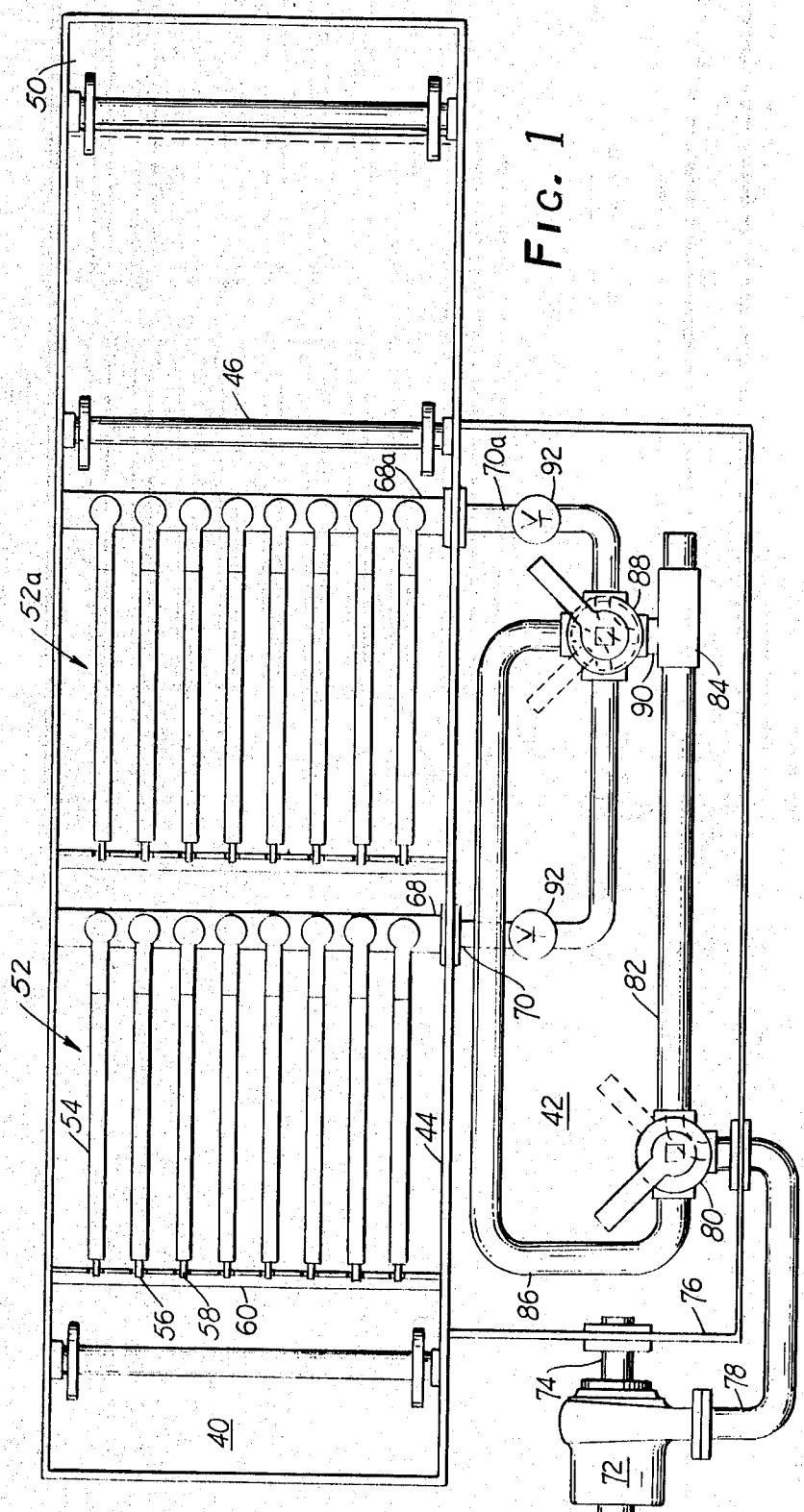

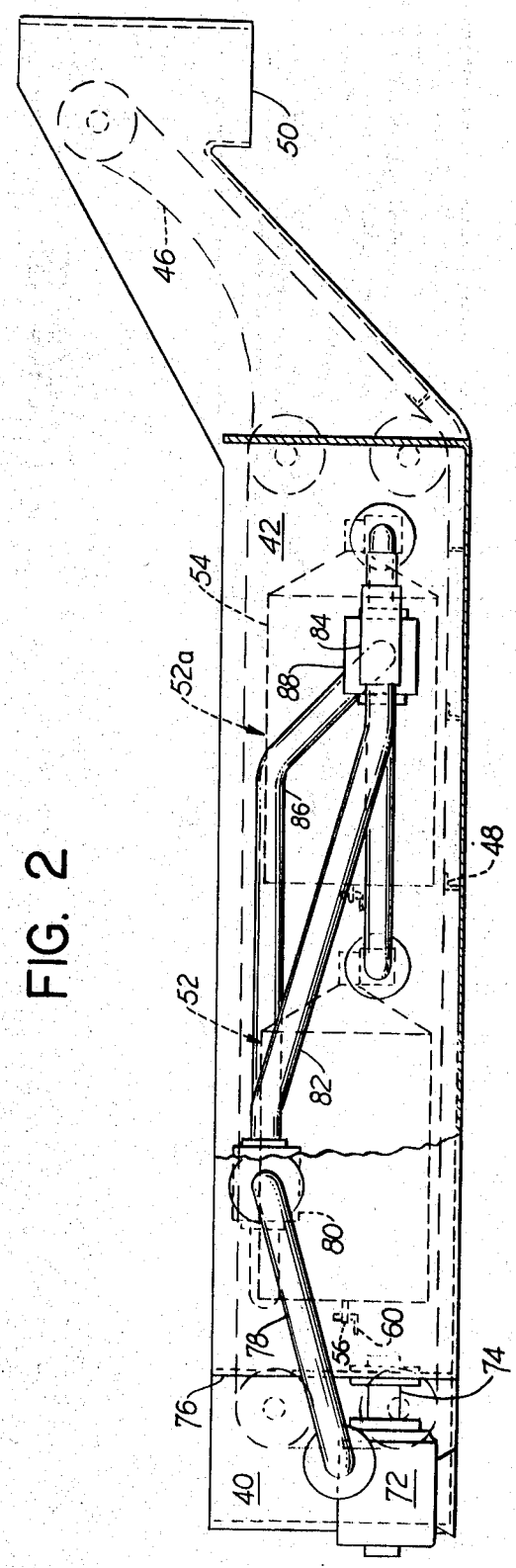

INVENTOR.
STEPHEN BARRETT BARMORE

INVENTOR.
STEPHEN BARRETT BARMORE
BY

FILTER BACKWASH MEANS

The present invention relates to the art of fluid filtration and is particularly concerned with central filtering systems having filters cleanable by backwashing.

In the past, much difficulty has been caused by the abrasive action of the contaminants, in coolants, on pumps, etc. and also by their tendency to settle out and build up hard deposits which are usually formed at inconvenient points. It is obviously desirable to avoid pumping unfiltered coolant and to keep it away from mechanisms and closed conduits, etc. It is also highly desirable to simplify maintenance as much as possible.

Accordingly, the invention comprehends the following objectives:

a. the avoidance of presenting unfiltered fluids to moving parts, especially pumps and valves;

b. the avoidance of pressure vessels;

c. the provision of simple filter backwashing means having no moving parts such as scraper blades, vanes, moving nozzles, etc.;

d. the provision of a filtering system wherein the filtering elements are arranged so that some may be removed for servicing while others are performing their normal function;

e. the provision of a filtering system wherein a single pump is used for creating both normal flow at subatmospheric pressure and backwash flow at above atmospheric pressure;

f. the use in a filtering system having a clean filtrate holding reservoir of an eductor wherein a negative pressure is developed to afford above ambient operating pressure differential across the filter units; and g. the combination in a fluid filtering system satisfying objective *f* supra, of means whereby the flow from the eductor may be returned to either the "dirty" fluid reservoir or the clean filtrate reservoir as desired.

Other objectives, not listed above, may be discerned on reading the following and studying the appended drawings, in which:

FIG. 1 shows in schematic form a plan view of a preferred embodiment of the invention with some parts omitted;

FIG. 2 is a schematic side elevation of the device of FIG. 1, partly broken open for greater clarity;

Figure 3:
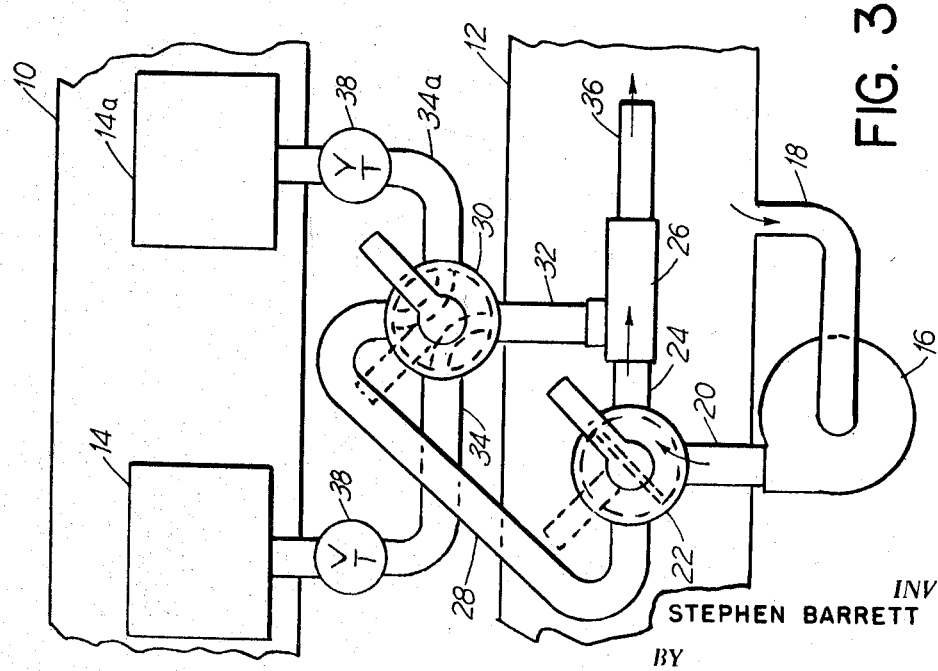
FIG. 3 is a simple diagrammatical drawing of the device of FIGS. 1 and 2.

Turning first to FIG. 3, the functions will be explained before considering the structure. The device comprises a pair of tanks, one of these, 10, receives from any convenient source (not shown) fluid to be filtered. The other tank, 12, serves as a reservoir for filtered fluid. A pair of similar filter units 14 and 14a are immersed in tank 10. A pump 16 draws clean fluid through duct or line 18 from tank 12 and discharges it through line 20 to two-way valve 22 which connects two lines, one, line 24, leads to an eductor 26 while the other, 28, goes to the three-way valve 30. A suction duct or line 32 leads from the said eductor to the said three-way valve which is connected by lines 34 and 34a to the filter units 14 and 14a respectively. In operation, with the valves 22 and 30 set as shown, fluid is pumped from tank 12 through eductor 26 (as shown by the flow indicating arrows) and through the outlet thereof, 36, and returns to tank 12. In passing through the said eductor, the fluid creates a suction therein which causes dirty fluid to be drawn from tank 10, through filter unit 14, where it is cleaned, line 34, three-way valve 30 and suction line 32 to eductor 26 where it mixes with the pumped fluid and passes through the outlet 36 into tank 12. During operation as described, the second filter unit 14a is isolated and available for whatever servicing is desired. However, if and when required, the three-way valve 30 may be turned to connect the said filter unit to the eductor and to simultaneously isolate unit 14. It should also be noted that if two-way valve 22 is turned to discharge pumped fluid into line 28, the eductor will be cut off and fluid will flow through valve 30 to the previously isolated filter 14a and backflush it for cleaning. If, however, valve 30 were changed in position at the same time that valve 22 were changed, the filter unit in use would be backflushed and the condition of the isolated unit would be unchanged. Throttle valves 38 are inserted in the lines 34 and 34a so that flow rates through the filters may be regulated as required by operating conditions. The functional mode above described applies to the devices of FIGS. 1—5 inclusive and should be kept in mind when considering the constructional explanations which follow.

Figure 7:
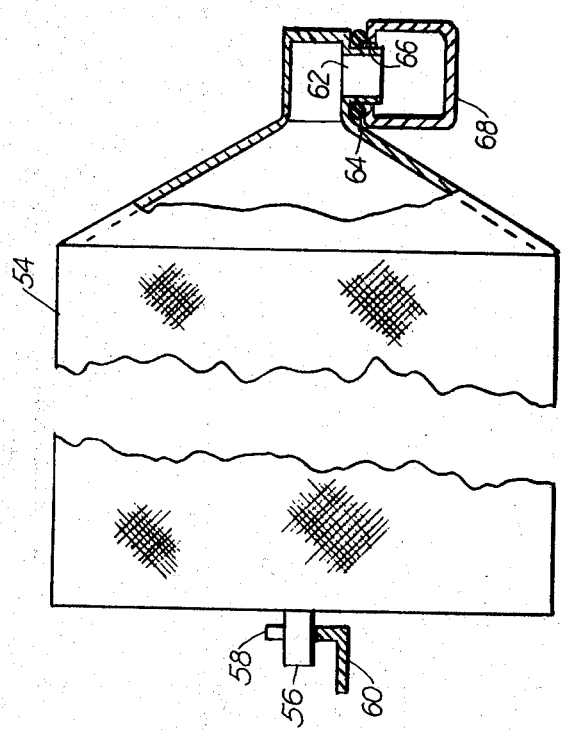
FIG. 7 shows certain details of the filtering units per se.

Turning now to FIGS. 1 and 2, the construction here shown comprises a dirty fluid tank 40 and a clean fluid tank 42 which may be in the form of a single weld having a common dividing wall 44. The said dirty fluid tank 40 is equipped with a motor driven drag flight conveyor 46 of conventional construction whose scrapers 48 remove from the bottom of the said tank and discharge, through port 50, debris separated from the dirty fluid either by the filters or by gravity. All of this is well known and needs no further elaboration. The filter units 52 and 52a comprise a number of separate fabric covered plates or leaves 54 which are supported at the blind end in any convenient way, such as that shown in FIG. 7 for instance, where a support pin 56 rests in a locating slot 58 in an angle-iron bar 60 extending across tank 40. The other end of the leaf 54 has a tubular stub 62 carrying an O-ring 64 adapted to nest in sealed engagement in a suitable port 66 in a manifold extending across the said tank. In the construction shown, there are two such manifolds, 68 and 68a which are preferably welded in place and connect through wall 44 with the outlet pipes 70 and 70a which are the functional equivalents of lines 34 and 34a shown in FIG. 3 and earlier described. The said bars and manifolds are preferably located to cause total immersion of the filter members 54. A motor-driven pump 72 has an inlet pipe or duct 74 secured to and passing through the end wall 76 of tank 42; the said inlet pipe is located an appreciable height above the bottom of the tank so that it is unlikely to draw in any solids that may have settled therein. The delivery pipe 78 of said pump passes through the side of tank 42 and is connected to the two-way valve 80. From this valve, one pipe 82 is connected to the eductor 84 while another pipe 86 runs from the said valve to a three-way valve 88; the said eductor is also connected, via its suction port and a short pipe 90 with the said three-way valve. Throttle valves 92 are preferably inserted in outlet pipes 70 and 70a so that flow rates through the filters may be regulated to suit operating conditions. In operation with the valves 80 and 88 set as shown in the drawings, suction created in the eductor 84 by passage of fluid from pump 72 will cause fluid to be drawn from tank 40 through filter unit 52a while filter unit 52 is isolated. Choice of filter unit in service, backwashing and so forth may be determined by manipulation of the said two and three-way valves exactly as earlier described in relation to FIG. 3. In a structure of the type in case, the valves are normally power operated and are under the control of a programming device. In the interest of clarity, no description of such items is offered as they form no part of the invention and are commercially well known.

Figure 4:
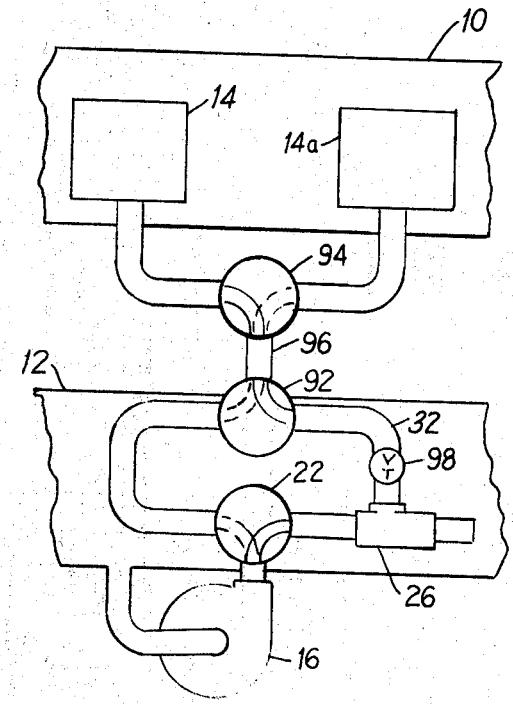
FIG. 4 shows a modification of FIG. 3.

FIG. 4 schematically depicts a device similar to that of FIG. 3 except that two two-way valves 92 and 94 with their connecting line 96 replace the three-way valve 30 earlier shown and that only one throttle valve 98, here inserted in suction line 32, is used; other components are unchanged. With the valves in the positions shown, fluid will be drawn from tank 10 through filter unit 14 by suction created in eductor 26 as previously described. Turning valve 94 to its alternate position (indicated by a broken line representing porting in the plug) filter unit 14a would be brought into use and unit 14 isolated. Turning valves 22 and 92 to their alternate positions (also indicated by broken lines) would direct fluid from pump 16 to valve 94 and thence to one of said filter units with a backwashing effect. The choice of units would depend on the position of valve 94.

Figure 5:
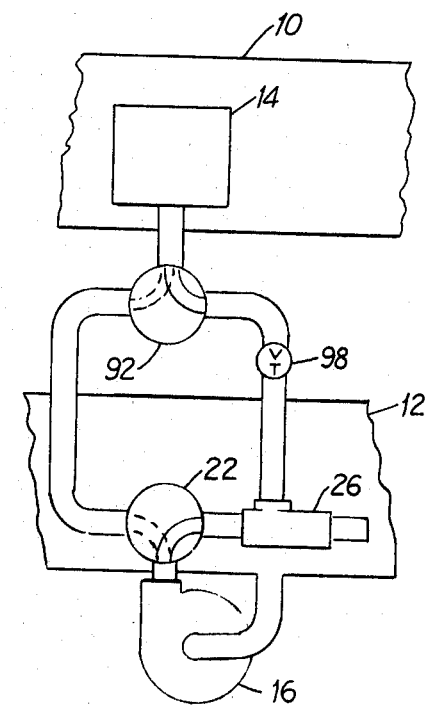
FIG. 5 shows a simplification of FIG. 4.

The device of FIG. 5 is the equivalent of that of FIG. 4 less filter unit 14a and two-way valve 94. With the valves 22 and 92 in the positions shown, suction created in eductor 26 would draw fluid from tank 10 through filter unit 14. With the said valves in their alternate positions, fluid from pump 16 would be diverted in backwashing effect to the said unit.

Figure 6:
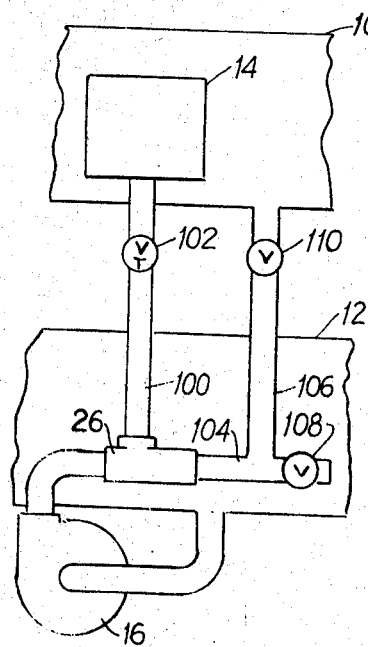
FIG. 6 is a diagrammatical drawing of another embodiment of the invention affording a modification of the operating functions of the device of FIG. 5.

The construction shown diagrammatically in FIG. 6 has fluid tanks 10 and 12, filter unit 14 and pump 16 just as previously described. Eductor 26 is connected to the said filter unit by a suction line or duct 100 in which a throttling valve 102 is inserted, all functioning as earlier explained. However, the said eductor is provided with an outlet duct 104 from which branches another duct 106 leading back to tank 10, said outlet duct has a shutoff valve 108 downstream of return duct 106 and the latter also has a shutoff valve 110. Pump 16 delivers directly to the eductor 26 through duct 112. In operation with pump 16 running, valve 108 open and valve 110 closed, passage of fluid from tank 12 through the eductor 26 will create a negative pressure in duct 100 and cause fluid to be drawn from tank 10 through filter unit 14 to pass thence to tank 12 through eductor outlet 104. If valve 108 is now closed, fluid flow through duct 100 will be reversed affording a backwashing effect on the aforesaid filter unit. If valve 110 is now opened, fluid will again be drawn from tank 10 through the filter unit but will be returned to tank 10 (instead of being delivered to tank 12) whereby the system may be purged of any impurities that may have entered during a filter unit servicing period. A plurality of filter units may be added to this system by them from line 100 and fitting them with individual shutoff valves; the addition of such extra units seems, however, to be so elementary as to need no further drawings.

I claim:

1. A filtering device of the class described comprising, a receptacle for fluid to be filtered, filter means located at least in part within said receptacle and having an outlet port, an eductor having an inlet port for admission of fluid at above ambient pressure, a suction port for admission of fluid at subambient pressure and a discharge port for discharging fluid entering said eductor and to direct it to a receiver for filtrate, a pump arranged to draw filtrate from said receiver and to discharge it from a pressure port, a fluid transport system comprising, a first duct running from said outlet port to said suction port, a second duct running from said pressure port to said inlet port, a third duct having at one end a junction with said first duct and having at another end a junction with said second duct, flow-diverting valves inserted in said ducts and constituting said junctions, said valves having a plurality of settings and being arranged so that at one setting filtrate discharged from said pump will pass to said outlet port to affect backwashing of said filter means and at another setting said filtrate discharge will pass through said eductor from said inlet port to said discharge port thereby creating a subambient pressure at said suction port and causing fluid to be drawn from said receptacle through said filter means and said outlet port to said eductor for discharge in the form of filtrate to said receiver.

2. A device according to claim 1 wherein a flow-regulating valve is located in said first duct to control the flow of filtrate from said filter means to said eductor.

3. The device of claim 1 wherein said filter means comprises a plurality of elements each having a filtering system and an outlet port adapted for mechanical supporting and fluid-transmitting engagement with a manifold which comprises a portion of said first duct and is secured within said receptacle, said receptacle having a portion engaged by said elements at a point remote from said outlet port whereby said elements are completely supported.

4. The device of claim 3 wherein said filter means comprises a single group of said elements and each of said valves is a two-way valve constituting a toe-form junction with its associated ducts.

5. A device according to claim 3 wherein said elements comprise two separate groups each having its own manifold, said manifolds being tied together and with said first duct by a two-way valve suited to isolate either of said groups from flow-wise connection with said eductor as may be predetermined and wherein said last mentioned valve is not one of said flow diverting valves.

6. The device of claim 3 wherein said elements comprise two separate groups, each having its own manifold, said manifolds being joined together and with said first duct by a three-way valve constituting one of said flow-diverting valves and being suited to connect either of said groups to said eductor as may be predetermined and to connect the group not so predetermined to the other of said flow-diverting valves via said third duct.

7. The device of claim 3 characterized by said mechanical supporting and fluid transmitting engagement being effected by the interengagement of a tubular stub within an opening shaped and sized therefor, one of which interengaging ports constitutes said outlet port.

8. The device of claim 7 wherein an O-ring seal surrounds said stub and has sealing engagement therewith and with the boundary of said opening.

9. A filtering device comprising, a receptacle for fluid to be filtered, filter means located at least in part within said receptacle and having an outlet port, an eductor having an inlet port for admission of fluid at above-ambient pressure, a suction port for admission of fluid at subambient pressure and a discharge port for discharging fluid entering said eductor and to direct it to a receiver for filtrate, a pump arranged to draw filtrate from said receiver and discharge it from a pressure port, a fluid transport and flow regulating system comprising, a first duct running from said outlet port to said suction port, a second duct running from said pressure port to said inlet port, a third duct having a shutoff valve and extending from said discharge port and arranged and adapted to direct filtrate to said receiver, a fourth duct branched from said third duct upstream of said shutoff valve and arranged to direct filtrate from said eductor to said receptacle and having valve means to permit or to prevent such discharge as desired.

10. The device according to claim 9 wherein said filter means comprises a plurality of elements each having a filtering system and an outlet port adapted for mechanical-supporting and fluid-transmitting engagement with a manifold which comprises a portion of said first duct and is secured within said receptacle, said receptacle having a portion engaged by said elements at a point remote from said outlet port whereby said elements are completely supported.

11. The device according to claim 10 wherein said mechanical-supporting and fluid-transmitting engagement is effected by the interengagement of a tubular stub within an opening shaped and sized therefor, one of which interengaging ports constitutes said outlet port.

12. The device according to claim 11 wherein an O-ring seal surrounds said stub and has sealing engagement therewith and within the boundary of said opening.